(12) United States Patent
Minto et al.

(10) Patent No.: US 7,230,543 B2
(45) Date of Patent: Jun. 12, 2007

(54) DOWNHOLE CLOCK SYNCHRONIZATION APPARATUS AND METHODS FOR USE IN A BOREHOLE DRILLING ENVIRONMENT

(75) Inventors: James Minto, Houston, TX (US); Martin Sorrells, Conroe, TX (US); Peter Harvey, Tampa, FL (US)

(73) Assignee: Weatherford Canada Partnership, Houston, TX (US)

( * ) Notice: Subject to any disclaimer, the term of this patent is extended or adjusted under 35 U.S.C. 154(b) by 839 days.

(21) Appl. No.: 10/618,269

(22) Filed: Jul. 9, 2003

(65) Prior Publication Data

US 2005/0007259 A1 Jan. 13, 2005

(51) Int. Cl.
*G01V 1/00* (2006.01)

(52) U.S. Cl. .................. 340/854.3; 367/81; 73/152.01

(58) Field of Classification Search .................. 367/81; 73/152.01
See application file for complete search history.

(56) References Cited

U.S. PATENT DOCUMENTS

| | | | |
|---|---|---|---|
| 5,555,220 A | 9/1996 | Minto | |
| 5,585,556 A | 12/1996 | Petersen et al. | |
| 5,842,149 A | 11/1998 | Harrell et al. | |
| 6,023,444 A | 2/2000 | Naville et al. | |
| 6,308,137 B1 | 10/2001 | Underhill et al. | |
| 6,382,332 B1 | 5/2002 | Eaton | |
| 6,614,718 B2 * | 9/2003 | Cecconi et al. | 367/86 |
| 2002/0060952 A1 | 5/2002 | Cecconi et al. | |
| 2002/0153481 A1 * | 10/2002 | Stoller et al. | 250/266 |
| 2003/0211768 A1 * | 11/2003 | Cameron et al. | 439/191 |

FOREIGN PATENT DOCUMENTS

| | | |
|---|---|---|
| EP | 0716319 A2 | 6/1996 |
| EP | 1002934 A2 | 5/2000 |
| WO | WO98/17894 | 4/1998 |

* cited by examiner

*Primary Examiner*—Brian Zimmerman
*Assistant Examiner*—Hung Q Dang
(74) *Attorney, Agent, or Firm*—Patrick H. McCollum

(57) ABSTRACT

Geophysical measurement system employed during the drilling of a well borehole. The system employs a reference clock disposed within equipment at the surface of the earth and a borehole assembly which houses a downhole clock and at least one sensor. The borehole assembly is operationally connected to a drill string, which advances the borehole. At least one synchronization shuttle apparatus containing a shuttle clock is conveyed downhole to the borehole assembly to synchronize the borehole clock with the reference clock. Reference and borehole clock synchronization is maintained at one millisecond or less over a period of days. Outputs from the reference clock and borehole clock and sensor are combined to obtain a measure of a geophysical parameter of interest. Although the measurement system is particularly applicable to seismic-while-drilling measurements, it can be used in a wide variety of clock driven geophysical measurements.

23 Claims, 3 Drawing Sheets

DOWNHOLE CLOCK SYNCHRONIZATION APPARATUS AND METHODS FOR USE IN A BOREHOLE DRILLING ENVIRONMENT

BACKGROUND OF THE INVENTION

This invention is directed toward geophysical measurement apparatus and methods employed during the drilling of a well borehole. More specifically, the invention is directed toward seismic measurement apparatus and methods for synchronizing a clock within the borehole with a reference clock at the surface of the earth using a shuttle system. A synchronization shuttle apparatus is inserted and conveyed within the borehole to operationally connect with apparatus containing the borehole clock and thereby synchronize the borehole clock with the reference clock.

Systems for measuring parameters within a well borehole, and geophysical parameters of earth formation in the vicinity of the well borehole, typically fall within two categorizes. The first category includes systems that measure parameters after the borehole has been drilled. These systems include wireline logging, tubing conveyed logging, slick line logging, production logging, permanent downhole sensing devices and other techniques known in the art. The second category includes systems that measure formation and borehole parameters while the borehole is being drilled. These systems include measurements of drilling and borehole specific parameters commonly known as "measurements-while-drilling" (MWD), measurements of parameters of earth formation penetrated by the borehole commonly known as "logging-while-drilling" (LWD), and measurements of seismic related properties known as "seismic-while-drilling" or (SWD).

Some measurements made while drilling a borehole require that sensor responses to parameters and events within the borehole, or "downhole", be synchronized to sensor responses and events at the surface of the earth. As an example, SWD systems typically require the accurate and precise measure of travel time of acoustic energy between the surface of the earth and a downhole assembly disposed at a known depth within the borehole. The response of a sensor to a displaced source of acoustic energy is combined with synchronized outputs of cooperating clocks to obtain the measure of travel time. This measure of travel time is subsequently used to convert acoustic impedance interfaces measured in a time domain to corresponding positions of the interfaces in a depth domain. A "downhole" clock disposed within a downhole assembly is typically synchronized with a surface or "reference" clock disposed within surface electronics equipment. The downhole assembly is then deployed within the borehole. The downhole assembly can be deployed for a period of several days with no continuous communication link, such as an electrical cable, with the surface equipment.

In order to obtain the desired accuracy and precision, SWD measurement techniques typically require downhole clock and reference clock synchronization of less than 1 millisecond (ms) over a time period as great as several days. Clocks available to achieve this accuracy are available for use at room temperature. No clocks are known to be available which provide the required accuracy in a borehole drilling environment, which typically involves elevated and varying temperature, significant shock and high vibration. All of these factors adversely affect the accuracy of the downhole clock. After a period of a day or more, synchronization between the downhole and reference clock degrades to a point that seriously jeopardizes the accuracy of any SWD measurements. Electrical, acoustic, pressure or electromagnetic communication links between the surface equipment and the downhole assembly can be used to periodically update synchronization between the downhole clock and the reference clock. The establishment of any type of direct link is, however, typically economically and operationally costly in that it impedes the drilling process, can jeopardize the integrity of the well bore, is formation dependant, and lacks precision to obtain the required synchronization accuracy.

SUMMARY OF THE INVENTION

Synchronization between the reference clock and the downhole clock is maintained using a small clock conveyed between the surface of the earth and a downhole assembly. This clock is incorporated within a pressure housing element of a "shuttle", and will be referred to as a "shuttle" clock. The shuttle also comprises a power supply for operating the clock, a means for thermally insulating the shuttle clock for a relatively short period of time, and a data port for transferring data into and out of the shuttle. The shuttle comprises additional elements that will be discussed in subsequent sections of this disclosure. A plurality of shuttles is deployed, preferably at predetermined intervals over the duration of deployment of the downhole assembly. Each shuttle deployment results in resynchronization of the downhole clock to the reference clock. Shuttle deployment frequency is typically determined by the accuracy of the downhole clock, and is selected to preferably maintain the downhole clock within the typically required accuracy of 1.0 ms.

The reference clock within the surface equipment, and the downhole clock prior to deployment, are both preferably synchronized to Coordinated Universal Time (UTC) The shuttle clock data port is operationally connected to the reference clock via a communication link, such as a hard wire or a radio frequency RF link, prior to deployment. The shuttle clock is synchronized to UTC using the reference clock.

The shuttle is next deployed in the drill string during routine drill pipe connection during the drilling operation and subsequently conveyed down the drill string to the borehole assembly by pumped drilling fluid used in the drilling operation. The shuttle operationally connects to a receiver element of the borehole assembly using the data port and a second communication link, which again can comprise a short range radio frequency (RF) link or a wet connector assembly. The downhole clock is then synchronized to the shuttle clock. Since the shuttle clock is thermally insulated within the shuttle and the time required to convey the shuttle from the surface to the borehole assembly is short (typically of the order of an hour or less), accuracy requirements of the shuttle clock are much less stringent than those of the downhole clock. As an example, a commercially available clock with an accuracy of 40 to 250 ppb at a temperature of 85 degrees Centigrade (° C.) can be used as a shuttle clock. Relationships between (1) shuttle deployment time intervals, (2) shuttle travel time, and (3) accuracy of the downhole clock are factors in maintaining 1 ms accuracy of the downhole clock, as will be discussed and illustrated in a subsequent section of this disclosure.

The borehole assembly can send resynchronization adjustments back to the surface equipment via drilling fluid pulses. Other forms of telemetry systems can be used, including electromagnetic telemetry and acoustic telemetry as examples. This information can be used to determine optimum time deployment of the next shuttle.

Each deployed shuttle can be retained and stored within the borehole assembly for subsequent retrieval when the borehole assembly is eventually removed from the well borehole. As an alternate, shuttles can be allowed to pass through the borehole assembly and return to the surface via the circulating drilling fluid. As yet another alternate, the shuttle can be considered "disposable" and therefore deformed and destroyed after data transfer to the borehole assembly. Resulting debris from a destroyed shuttle is returned to the surface via the circulating drilling fluid. Destruction is economically feasible. Because of relatively low accuracy requirements, relatively inexpensive clocks can be used in the shuttles.

BRIEF DESCRIPTION OF THE DRAWINGS

So that the manner in which the above recited features, advantages and objects the present invention are obtained and can be understood in detail, more particular description of the invention, briefly summarized above, may be had by reference to the embodiments thereof which are illustrated in the appended drawings.

DETAILED DESCRIPTION OF THE PREFERRED EMBODIMENTS

Figure 1:
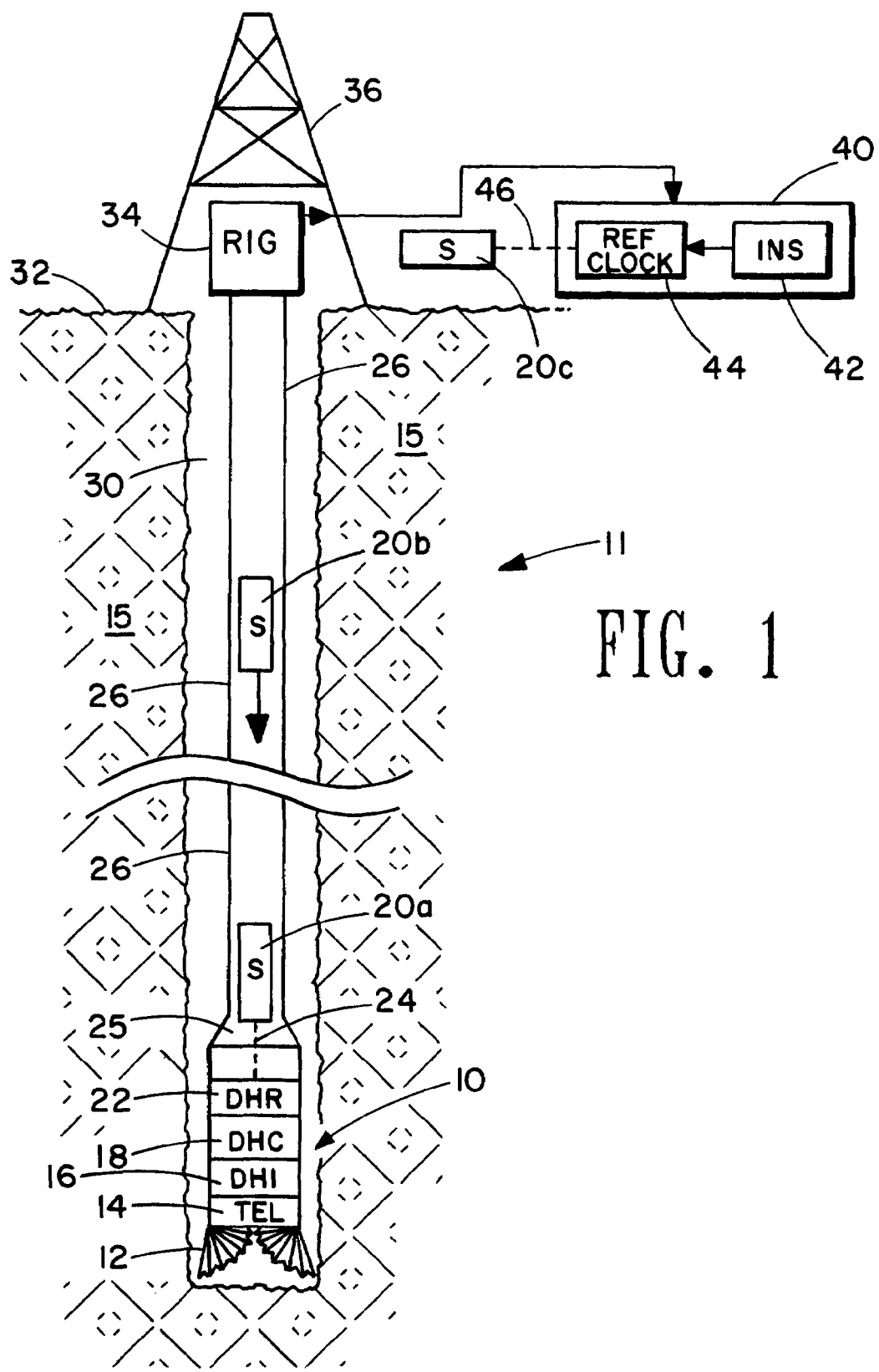
FIG. 1 conceptually illustrates a generic measurement system 11 for making borehole and formation measurements while a borehole is being drilled.

As discussed previously, reference clock and downhole clock synchronization (preferably to UTC) is maintained using a small shuttle clock conveyed between the surface of the earth and a downhole assembly. FIG. 1 conceptually illustrates a generic measurement system 11 for making borehole measurements and formation measurements while the borehole is being drilled. For purposes of discussion, it will be assumed that the system 11 is a seismic-while-drilling (SWD) system, which requires accurate synchronization between a reference clock and a downhole clock over an extended time period such as days.

Again referring to FIG. 1, a well borehole 30 is shown penetrating earth formation 15. The borehole 30 is advanced by means of a borehole assembly 10 comprising a drill bit 12. The borehole assembly 10 is operationally attached to a drill string 26 which is rotated by a rotary drilling rig 34 partially supported by a derrick 36. The borehole assembly 10 also comprises a telemetry system 14, such as mud pulse system, which provides a communication link between the borehole assembly and surface equipment 40 located at the surface 32 of the earth. Surface equipment 40 is shown operationally connected to the drilling rig 34. The borehole assembly 10 further comprises an instrument section 16, which typically comprising one or more measuring sensors, control electronics including a processor, and a source of power to operate certain elements of the borehole assembly 10 power supply. Since it is assumed that the system 11 is a SWD system, sensors would typically comprise acoustic transducers to measure acoustic energy transmitted from the earth surface 32 by a source (not shown) preferably under the control of the surface equipment 40.

Still referring to FIG. 1, the borehole assembly 10 further comprises a downhole clock 18 and a downhole data receiver means 22. As discussed previously, the downhole clock 18 must be synchronized with a reference clock 44 preferably disposed in the surface equipment 40 and controlled by a surface instrument element 42. Synchronization is obtained by the use of one or more shuttles.

Figure 2:
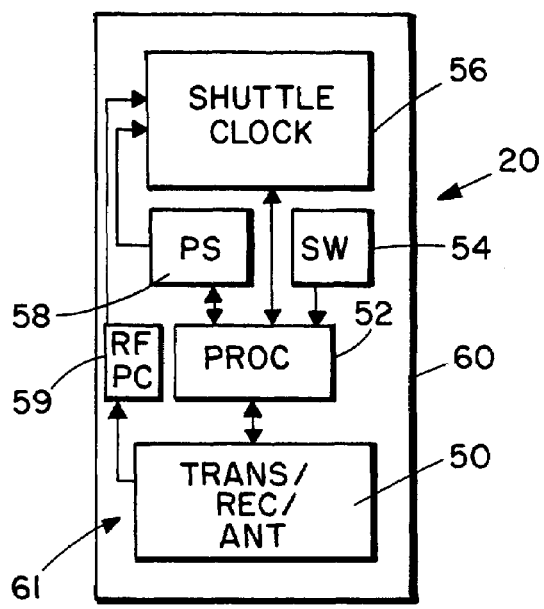
FIG. 2 is a functional diagram of a shuttle illustrating major elements and their interactions.

FIG. 2 is a functional diagram of a shuttle 20. The shuttle comprises an evacuated pressure housing 60 in which a shuttle clock 56 is disposed. The clock preferably comprises an oven-controlled crystal oscillator (OCXO), although other types of oscillator means can be used. A suitable OCXO is manufacture by Temex, has an accuracy of 40 ppb at 70° C., requires 150 milliamperes (mA) of current, and is relatively inexpensive. The shuttle clock 56 is powered by a power supply 58. Two AA size batteries provide sufficient power, although other sources of power can be employed. A data port means is used to transfer data from and to the shuttle 20. The data port illustrated is transmitter-receiver means 50 shown is a short range RF transmitter-receiver and antenna assembly. Alternately data port means include a mechanical wet connector or a short range magnetic transmitter-receiver means.

The shuttle preferably transmits synchronization information periodically. The downhole receiver 22 receives this synchronization information when the shuttle 20 is within range. Alternately, to save power, short burst signals are transmitted periodically by the shuttle 20. When a short burst signal is received by the downhole receiver 22, "handshaking" between the shuttle and the downhole receiver occurs resulting in an updating of synchronization information for the downhole clock 18. Yet another alternate data transfer technique comprises short, periodic pulses transmitted by the shuttle at predetermined time intervals, such as one second. Upon reception of one of these pulses by the downhole receiver 22, the downhole clock is resynchronized to the nearest second. As yet another alternate data transmission technique, switch means 54, such as a magnetic switch, is used to activate the shuttle 20 for shuttle clock synchronization data transfer. All previously discussed elements of the shuttle 20 are controlled by a processor 52, which can be programmed to perform additional tasks such as tracking the time of day and other parameters used in the measurement system.

Still referring to FIG. 2, the pressure housing 20 is preferably filled with an aerogel insulating compound 61 to provide thermal stability for the clock 56 and other elements of the shuttle. It is desirable to hold the interior of the shuttle at 85° C. or less. Alternate means for thermal stabilization can be used such as a heating means, a cooling means, or a Dewar flask.

Still referring to FIG. 2, the shuttle 20 comprises a RF power converter 59 that cooperates with the clock 56 and other elements within the pressure housing 60. The RF power converter 59 receives RF power through the transmitter-receiver means 50 preferably from the surface equipment 40. This feature allows the shuttle to be sealed at manufacture, and turned on prior to synchronization and deployment without depleting the power supply 58 which is preferably one or more batteries. A typical ovenized clock 56 requires several minutes for heating to stabilize the crystal at the proper operating temperature. During this period, external power is provided through the illustrated transmitter-receiver means 50, and power is switched to the internal power supply 58 immediately prior to launching the shuttle. It is noted that if an data port means is employed, such as a wet connector, the RF power converter 59 is not needed.

Again referring to FIG. 2 and assuming for purposes of discussion that the data port means comprises a RF transmitter-receiver means 50, non-magnetic material are used to fabricate the shuttle 20. Non-magnetic materials include aluminum alloys, BeCu, inconel alloys, titanium alloys, 316L stainless steel and aistenitic steel. Fiberglass and thermoplastic materials are additional choices of non-magnetic materials.

A shuttle outside diameter (OD) of about 1.91 centimeters (0.75 inches) and an inside diameter (ID) of about 1.52 centimeters (0.60 inches) are preferred, with a length required to house the elements discussed above.

Referring again to FIG. 1, the launching of multiple shuttles are illustrated conceptually. Shuttle 20*a* is the first launched and is shown positioned within a shuttle receiver package 25 and synchronizing the downhole clock 18 through the downhole receiver 22 over a downhole communication link 24. If it is assumed that the shuttle data port is a RF transmitter-receiver means 50 as shown in FIG. 2, then the downhole receiver 22 is a compatible RF receiver and the communication link 24 represents short range RF transmissions. It is again emphasized that alternate communication means can be employed, such as a wet connector, and the corresponding downhole communication link 24 would be a "hard wire" connection provided by the wet connector and a compatible downhole receiver 22.

Still referring to FIG. 1, shuttle 20*b* conceptually represents a shuttle in transit. The clock 56 in shuttle 20*b* has been synchronized to the reference clock 44. Shuttle 20*b* was then inserted and launched within the drill string 26 at the rig 34, and is being conveyed to the borehole assembly 10 by pumped drilling fluid.

Shuttle 20*c* in FIG. 1 conceptually represents a shuttle being prepared for launching. The shuttle clock 56 is being synchronized with the reference clock 44 by means of the surface communication link 46. As with the downhole communication link 24, the surface communication link 46 is defined by the type of data port used in the shuttle, such as RF transmitter-receiver means 50 shown in FIG. 2. As discussed previously, the shuttle is powered by an external power source, preferably disposed in the instrument package 42, during synchronization, "warm-up" and launching.

Although not likely in typical drilling operations a plurality of shuttles can be in transit along the drill string 26 during the same time interval.

Recall that the shuttle 20 is conveyed along the borehole by pumped drilling fluid. Time required to convey a shuttle 20 from the surface of the earth 32 to the borehole assembly 10 is relatively short compared to the time the borehole assembly 10 and accompanying downhole clock 18 remain within the borehole 30. Assume that the borehole diameter is 21.6 centimeters (8.5 inches) and the inside diameter of the drill string 26 is 9.53 centimeters (3.75 inches). Assume further that the lowest possible mud fluid flow generated by a 17.1 centimeters (6.75 inches) diameter mud motor is 700 liters per minute. Based upon these parameters and assumptions, the lowest drilling fluid linear flow velocity within the drill string 26 will be 1.637 meters/second (5.372 feet per second). It would take 77.6 minutes for a unit volume of drilling fluid to travel 7,618 meters (25,000 feet). Typically, maximum linear flow velocity in drilling operations using shuttles would be at least twice as great as the above example. It is therefore, possible to convey a shuttle over a large section of borehole in a time period of less than one hour. Since the shuttle clock 56 is thermally insulated within the shuttle pressure housing 60 as discussed above, and since transit time between the surface and the borehole assembly is typically less than one hour, accuracy requirements of the shuttle clock 56 are much less stringent than those of the downhole clock 18. As an example, a commercially available clock with an accuracy of 40 to 250 ppb at a temperature of 85° C. can be used as a shuttle clock 56. Using a commercially available shuttle clock 56 with transit times of one hour or less, values of (1) shuttle deployment time intervals and (2) the inherent accuracy of the downhole clock 18 are factors in obtaining the desired synchronized accuracy of the downhole clock. Specific values of these parameters that are required to maintain the downhole clock 18 at synchronized accuracy of 1.0 ms or less will be discussed and illustrated in a subsequent section of this disclosure (see Table 1).

The borehole assembly can send resynchronization adjustments back to the surface equipment via, for example, drilling fluid pulses using the telemetry system 14. This information can be used to determine an optimum time interval for launching of the next shuttle.

Figure 3:
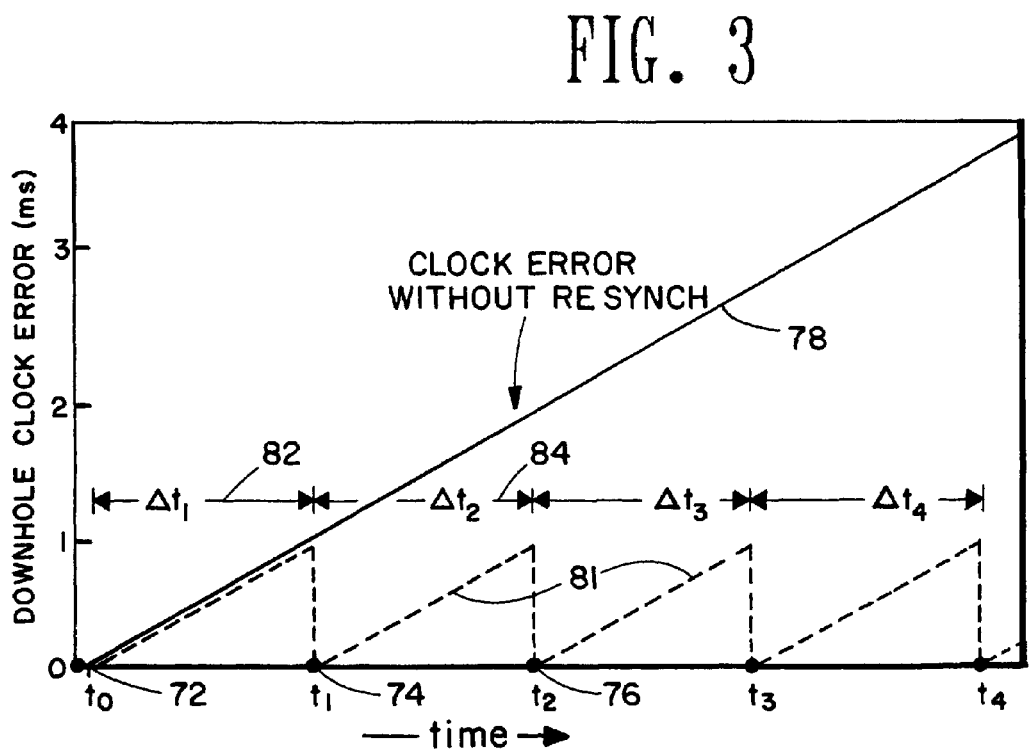
FIG. 3 illustrates graphically the effectiveness of the shuttle system in maintaining synchronization of the downhole clock.

FIG. 3 illustrates graphically the effectiveness of the shuttle system in maintaining synchronization of the downhole clock 18. The ordinate represents error in the downhole clock 18 (see FIG. 1) in ms. The ordinate represents time. The acceptable synchronized error in the downhole clock is 1.0 ms or less. The downhole clock 18 is initially synchronized with the reference clock 44 at the start of a drill bit trip, with the reference clock preferably being synchronized to UTC. This occurs at a time $t_0$ and is indicated at 72. Error increases as a function of time in the synchronization of the downhole clock 18, as indicated by curve 70. Stated another way, curve 70 represents the buildup of downhole clock error without resynchronization. After a time interval $\Delta t_1$ (82) measured from the start of the drill bit trip and at a time $t_1$ (74), downhole clock error exceeds the predetermined limit of 1.0 ms. A first shuttle is launched so that it reaches the borehole assembly at time $t_1$, and the downhole clock is resynchronized by the shuttle as discussed previously, and as illustrated by the broken curve 81. After a time interval $\Delta t_2$ (84) measured from the first resynchronization and at time $t_2$ (76), downhole clock error again exceeds the predetermined limit of 1.0 ms. A second shuttle is launched so that it reaches the borehole assembly at time $t_2$, and the downhole clock is resynchronized by the second shuttle as illustrated by the broken curve 81. The resynchronization process is repeated at each time $t_i$(i=1, 2, . . . n), and at a time interval $\Delta t_i$ from the resynchronization at time $t_{i-1}$, for as long as the downhole clock remains within the borehole 30. The shuttle method maintains downhole clock synchronization within a predetermined limit over a time period represented by the sum of time intervals $\Delta t_i$ (i=1, . . . , n), even though the downhole clock would have drifted out of the predetermined range after the first time interval $\Delta t_1$. This assumes that multiple shuttle transits do not overlap in time.

Shuttle launch intervals $\Delta t_i$ are determined by a number of factors including borehole conditions, drilling conditions, and the inherent accuracy of the borehole clock 18. Table 1 illustrates shuttle launch intervals $\Delta t_i$, as a function of inherent downhole clock accuracy, required to maintain downhole clock synchronization accuracy of 1.0 ms or less.

TABLE 1

(Synchronized Downhole Clock Accuracy 1.0 ms)

| Downhole Clock Accuracy | Launch Interval $\Delta t_i$ |
|---|---|
| 2.5 ppb | 4 days |
| 10 ppb | 1 day |
| 40 ppb | 6 days |

It should be noted that time intervals $\Delta t_i$ are not necessarily constant. Changes in borehole and/or drilling conditions can change the accuracy of the downhole clock 18. This requires variations in launch intervals in order to maintain a predetermined downhole clock synchronization limit. The transmitter-receiver means 50 is a two way transmission means. The downhole instrumentation package 16 can include sensors that monitor borehole conditions affecting downhole clock accuracy, or sensors that measure the rate of change of the accuracy of the downhole clock 18. These measurements can be transmitted to the surface equipment via the telemetry system 14 as mentioned previously, and adjustments in launch intervals $\Delta t_i$ can be made in order to maintain the predetermined downhole clock synchronized accuracy limit.

Figure 4:
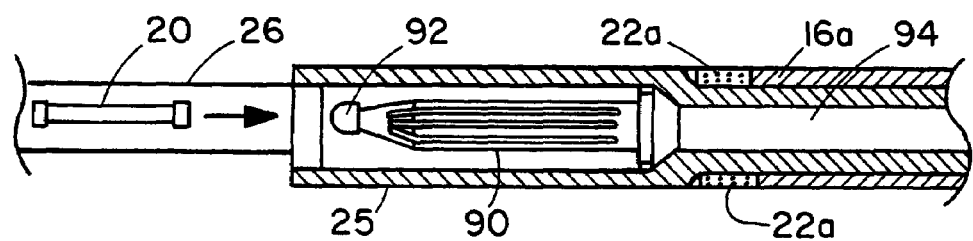
FIG. 4 shows in detail a shuttle receiver package element of a borehole assembly with a shuttle approaching the receiver package via a connecting drill string.

FIG. 4 shows in detail the shuttle receiver package 25 of the borehole assembly 10. A shuttle 20 is shown moving within the drill string 26 and toward the receiver package 25, as indicated with an arrow. The receiver package 25 comprises a shuttle catch 90 with slots through which pumped drilling fluid flows. The shuttle catch 90 is also preferably configured with a fishing neck 92. Once again, assuming that the transmitter-receiver means 50 is a short range RF device, the downhole receiver 22 is shown as coil 22a with associated electronics 16a. Drilling fluid flows through the slots in the shuttle catch 90 and into a conduit 94 that traverses the remaining borehole assembly elements and terminates at the drill bit 12.

Figure 5:
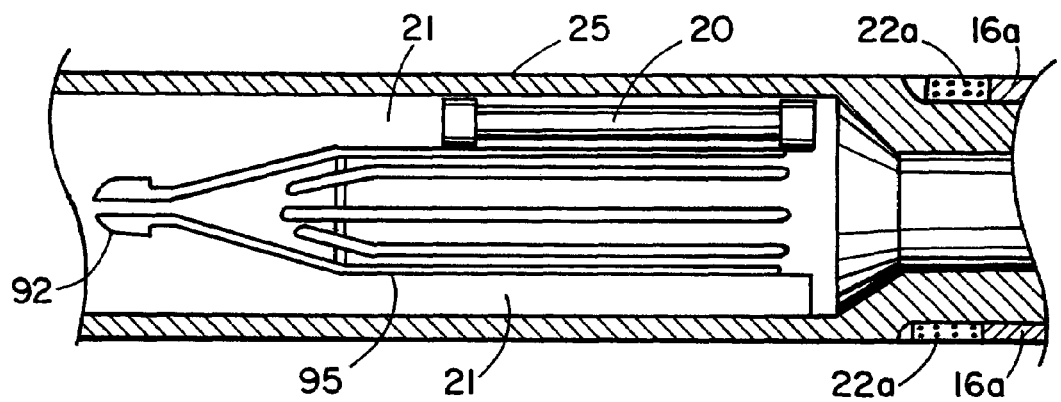
FIG. 5 shows a shuttle captured within the shuttle receiver after synchronization data have been transferred to the downhole clock within the borehole assembly.

Using the embodiment of the shuttle catch 90 shown in FIG. 4, the shuttle is stopped and retained within an annulus 21 as illustrated in FIG. 5. As discussed previously, the shuttle preferably transmits time of day periodically. The downhole receiver 22 receives continuously and responds to updated time of day by resynchronization. Alternately, to save power, short burst signals are transmitted periodically by the shuttle 20. When a short burst signal is received by the downhole receiver 22, handshaking between the shuttle and the downhole receiver occurs, and an updated time of day is transferred to the downhole clock 18. The shuttle is then preferably disabled for storage downhole to avoid any interfering transmission between the stored shuttle and the downhole receiver 22. Yet another alternate data transfer technique comprises short, periodic pulses transmitted by the shuttle at predetermined time intervals, such as one second. Upon reception of one of these pulses by the downhole receiver 22, the downhole clock is resynchronized to the nearest second. No time of day is transmitted thereby saving power. This technique requires that drift in the downhole clock 18 is less than one half of the predetermined time interval. As yet another alternate data transfer method, switch means 54, such as a magnetic switch, is used to activate the shuttle 20 for shuttle clock synchronization data transfer. The switch 54 (see FIG. 2) is activated by the shuttle catch 90, and the clock synchronization data are transferred. Using any of the data transfer techniques, clock synchronization data are transferred via the short range RF transmitter-receiver means 50 of the shuttle 20 to transmit the downhole receiver coil 22a and the associated electronic package 16a. These data are then used to resynchronize the downhole clock 18, as discussed previously. Subsequent shuttles enter the receiver package 25, transfer synchronization data to the receiver coil 22a and associated electronics 16a, and are retained radially within the annulus 21. Multiple shuttles can be retrieved for possible future use when the borehole assembly 10 is returned to the surface 32 of the earth.

Figure 6:
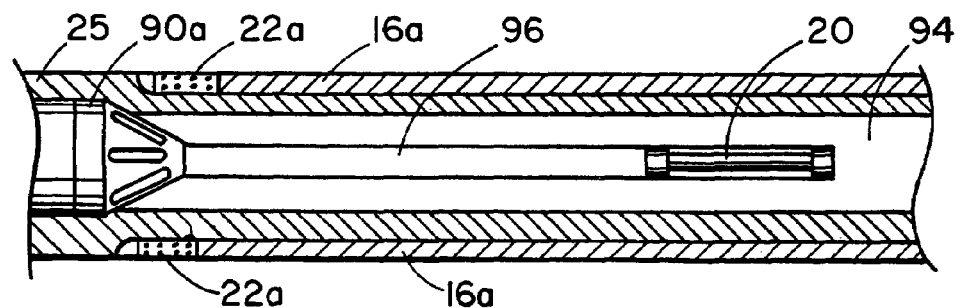
FIG. 6 illustrated an alternate embodiment of a shuttle receiver package.

FIG. 6 shows an alternate embodiment of a receiver package 25. Shuttles 20 enter the upper slotted shuttle catch 90a. Pumped drilling fluid flows through the slots and again enters the conduit 94 that traverses other elements of the borehole assembly 10. Synchronization data are transferred from the shuttle via RF transmitter-receiver means 50 to the receiver coil 22a prior to (or as) the shuttle passes the receiver coil as discussed above. The shuttles then are retained within a receptacle 96. Multiple shuttles are retained and stored axially (or "stacked") within the receptacle 96, and subsequently retrieved when the borehole assembly 10 is returned to the surface.

The cost of shuttles is relatively small since relatively inexpensive clocks are employed. It is, therefore, economically feasible, and possibly operationally feasible and desirable, to destroy shuttles "spent" after synchronization data have been passed to the downhole receiver 22. This type of shuttle will be referred to as a "disposable" shuttle.

One technique for destroying a spent, disposable shuttle is to first deform the pressure housing, and then allow the deformed housing to pass through the entire borehole assembly 10, wherein the drill bit 12 would grind or "digest" the spent shuttle. Resulting debris would be flushed from the borehole by return circulation of the drilling mud. Generally speaking, this means for destroying a spent shuttle would be practical if the size of the shuttle were less than the diameter of about 0.64 centimeters (0.25 inches).

Another technique for disposing of a spent disposable shuttle would be to jettison it through an opening in a drill collar wall and into the borehole-drill string annulus. This would require a drilling fluid flow diverter that would respond to the presence of a shuttle. As an example, the receiver package 25 would capture the shuttle, the synchronization data would be transferred, and a valve in the drill collar wall would open thereby allowing the spent shuttle to enter the borehole-drill string annulus and return to with the return drilling fluid flow.

Yet another technique for destroying a spent disposable shuttle would be by erosion. As an example, erosion can be used to weaken the spent shuttle pressure housing 60. The shuttle would then deform by collapsing to a size that can be digested by the drill bit 12, as discussed above. Possible pressure housing materials that would meet these erosion requirements would include composites that would be weakened by the drilling fluid, or alternately soft but relatively strong metals such as aluminum alloys.

The maximum linear flow velocity of drilling fluid past the shuttle receiver package 25 depends upon the inside diameter of the receiver package and the maximum outside diameter of the shuttle 20. For typical receiver package and shuttle dimensions, linear flow velocity past the shuttle receiver package can be as large as 12.2 meters/second (40 feet/second). Shuttle receiver package and shuttle dimensions must be selected so shuttle velocity is sufficiently slow to allow shuttle data to be read in receiver package embodiments where the shuttle passes the receiver coils 22a (see FIG. 6). If the shuttle is disposable, dimensions must also considered so that the shuttle can be deformed or collapsed if necessary, pass through the borehole assembly 10, and be digested by the drill bit 12.

As stated previously, FIG. 1 conceptually illustrates a generic measurement system 11 for making measurements of a geophysical parameter, while the borehole is being drilled. For purposes of discussion, it has been assumed that the system 11 is a seismic-while-drilling (SWD) system that requires accurate synchronization between a reference clock and a downhole clock over an extended time period, such as days.

The measurement system 11 can be used for alternate types of geophysical and borehole related measurements. Two examples will be given, but the system is adaptable to literally any type of MWD, LWD or SWD system that employs a downhole clock that must be maintained at a predetermined accuracy.

Neutron radiation spectroscopy techniques can be used in logging-while-drilling (LWD) systems. These techniques are disclosed in U.S. patent application Ser. No. 10/267,944 assigned to the assignee of this patent application, and hereby entered into this application by reference. A nuclear spectroscopy system comprises a borehole radiation spectrometer that measures intensity of radiation as a function of energy of radiation. Gamma radiation is typically the radiation of choice, but neutron radiation is also used. Borehole and geophysical parameters of interest are typically determined from measures of radiation intensity at selected radiation energies. Spectrometers are typically clock driven. A drift in clock accuracy results in gain and baseline shift of the spectrometer. This results in erroneous spectroscopic measurements which, in turn, result in inaccurate determinations of parameters of interest. With the measurement system 11 (see FIG. 1) embodied as a neutron spectroscopy system, the downhole instrument element 16 comprises a radiation spectrometer and cooperating radiation sensors. The downhole clock 18 controls the spectrometer, and is synchronized with the reference clock 44 utilizing shuttles 20, as disclosed above in detail. Resynchronization of the downhole clock maintains the desired gain and baseline "calibration" of the radiation spectrometer.

Pulse neutron logging is another nuclear measurement technique that is adapted to LWD systems, and that requires accurate timing. An example of this measurement technique is disclosed in U.S. Pat. No. 5,804,820, which is hereby entered into this application by reference. Pulses of preferably high energy neutrons are emitted by a neutron source, during predetermined time intervals, into borehole and formation surrounding the borehole. The neutrons induce gamma radiation and neutron radiation that is measured, during predetermined time intervals, using detectors that are activated both during neutron pulses and between neutron pulses. These measures of radiation are used to determine borehole and formation parameters of interest. Activation of the neutron source and activation of the radiation detectors are controlled by a clock. A drift in clock accuracy results in inaccurate radiation measurements which, in turn, result in inaccurate determinations of parameters of interest. With the measurement system 11 embodied as a pulsed neutron system, the downhole instrument element 16 comprises a source of pulsed neutrons and cooperating radiation detectors. The downhole clock 18 controls neutron source pulsing and the radiation detector counting, and is synchronized with the reference clock 44 utilizing shuttles 20, as disclosed above in detail. Resynchronization of the downhole clock maintains the desired source and detector activation intervals.

While the foregoing disclosure is directed toward the preferred embodiments of the invention, the scope of the invention is defined by the claims, which follow.

What is claimed is:

1. A shuttle for synchronizing a reference clock with downhole clock positioned within a borehole, said shuttle comprising;
    (a) a shuttle clock;
    (b) a data port operationally connected to said shuttle clock; and
    (c) a pressure housing in which said shuttle clock and said data port are incorporated; wherein
    (d) said shuttle clock is synchronized with said reference clock via a first transmission link provided by said data port;
    (e) said shuttle is conveyed along said borehole to said downhole clock by pumped drilling fluid;
    (f) said downhole clock is synchronized with said shuttle clock via a second transmission link provided by said data port thereby providing synchronization of said downhole clock with said reference clock; and
    (g) said pressure housing is deformed thereby allowing disposal of said shuttle within said borehole after said downhole clock is synchronized with said shuttle clock via said second transmission link.

2. The shuttle of claim 1 wherein said data port comprises a short range radio frequency transmitter and a radio frequency receiver and an antenna operationally connected to said transmitter and said receiver.

3. The shuttle of claim 1 wherein said data port comprises a wet connector.

4. The shuttle of claim 1 wherein said downhole clock is incorporated within a seismic-while-drilling system.

5. The shuttle of claim 1 wherein said downhole clock is incorporated within a nuclear spectroscopy logging-while-drilling system.

6. The shuttle of claim 1 wherein said downhole clock is incorporated within a pulsed neutron logging-while-drilling system.

7. A method for synchronizing a reference clock and a downhole clock positioned within a borehole with, the method comprising;
    (a) providing a shuttle comprising
        (i) a shuttle clock, and
        (ii) a data port operationally connected to said shuttle clock;
    (b) synchronizing said shuttle clock with said reference clock via a first transmission link provided by said data port;
    (c) conveying said shuttle along said borehole to said downhole clock by pumped drilling fluid;
    (d) synchronizing said downhole clock with said shuttle clock via a second transmission link provided by said data port thereby providing synchronization of said downhole clock with said reference clock:
    (e) providing a pressure housing suitable for disposal;
    (f) incorporating said shuttle clock and said data port within said pressure housing;
    (g) synchronizing said downhole clock with said shuttle clock via said second transmission link; and
    (h) subsequently disposing of said shuttle within said borehole.

8. The method of claim 7 wherein said downhole clock is incorporated within a seismic-while-drilling system.

9. The method of claim 7 wherein said downhole clock is incorporated within a nuclear spectroscopy logging-while-drilling system.

10. The method of claim 7 wherein said downhole clock is incorporated within a pulsed neutron logging-while-drilling system.

11. A measurement system for determining a geophysical parameter in the vicinity of a borehole, the system comprising:
   (a) surface equipment comprising a reference clock;
   (b) a plurality of shuttles each comprising a shuttle clock and a data port; and
   (c) a borehole assembly comprising at least one sensor and a downhole clock; wherein;
   (d) a synchronization procedure synchronizes said downhole clock with said reference clock by
      (i) synchronizing said shuttle clock with said reference clock via said data port,
      (ii) subsequently launching at least one shuttle into a first end of a drill string,
      (iii) conveying said at least one shuttle by means of pumped drilling fluid to said borehole assembly which terminates a second end of said drill string,
      (iv) synchronizing said downhole clock with said shuttle clock via said data port to obtain said reference clock and downhole clock synchronization;
   (e) outputs from said reference clock and from said downhole clock and from said at least one sensor are combined to determine said geophysical parameter; and
   (f) each shuttle of said plurality of shuttles is launched sequentially at time intervals required to maintain said reference clock and shuttle clock synchronization within a predetermined limit.

12. A measurement system for determining a geophysical parameter in the vicinity of a borehole, the system comprising:
   (a) surface equipment comprising a reference clock;
   (b) at least one shuttle comprising a shuttle clock and a data port;
   (c) a borehole assembly comprising at least one sensor and a downhole clock; and
   (d) a telemetry system linking said borehole assembly to said surface equipment; wherein
   (e) a synchronization procedure synchronizes said downhole clock with said reference clock by
      (i) synchronizing said shuttle clock with said reference clock via said data port,
      (ii) subseciuently launching at least one said shuttle into a first end of a drill string,
      (iii) conveying said at least one shuttle by means of pumped drilling fluid to said borehole assembly which terminates a second end of said drill string,
      (iv) synchronizing said downhole clock with said shuttle clock via said data port to obtain said reference clock and downhole clock synchronization;
   (f) outputs from said reference clock and from said downhole clock and from said at least one sensor are combined to determine said geophysical parameter;
   (g) one said shuttle is launched at time interval required to maintain said reference clock and shuttle clock synchronization within a predetermined limit; and
   (h) durations of said time interval is determined using information telemetered from said borehole assembly to said surface equipment via said telemetry system.

13. The measurement system of claim 12 wherein said data port comprises a short range radio frequency transmitter and a radio frequency receiver and an antenna operationally connected to said transmitter and said receiver.

14. The measurement system of claim 12 wherein said data port comprises a wet connector.

15. The measurement system of claim 12 wherein said at least one sensor comprises a seismic sensor.

16. A measurement system for determining a geophysical parameter in the vicinity of a borehole, the system comprising:
   (a) surface ecluipment comprising a reference clock;
   (b) at least one shuttle comprising a shuttle clock and a data port; and
   (c) a borehole assembly comprising at least one sensor and a downhole clock; wherein
   (d) a synchronization procedure synchronizes said downhole clock with said reference clock by
      (i) synchronizing said shuttle clock with said reference clock via said data port.
      (ii) subsequently launching at least one said shuttle into a first end of a drill string,
      (iii) conveying said at least one shuttle by means of pumped drilling fluid to said borehole assembly which terminates a second end of said drill string,
      (iv) synchronizing said downhole clock with said shuttle clock via said data port to obtain said reference clock and downhole clock synchronization; and
   (e) outputs from said reference clock and from said downhole clock and from said at least one sensor are combined to determine said geophysical parameter; and
   (f) each said shuttle further comprises a pressure housing in which said shuttle clock and said data port are incorporated, wherein said pressure housing is deformed thereby allowing disposal of said shuttle within said borehole after synchronizing said downhole clock with said shuffle clock via said data port to obtain said reference clock and downhole clock synchronization.

17. A method for determining a geophysical parameter in the vicinity of a borehole, the system comprising:
   (a) providing surface euuipment comprising a reference clock;
   (b) providing a plurality of shuttles each comprising a shuttle clock and a data port;
   (c) providing a borehole assembly comprising at least one sensor and a downhole clock;
   (d) synchronizing said downhole clock with said reference clock by
      (i) synchronizing said shuttle clock with said reference clock via said data port,
      (ii) subsequently launching at least one said shuttle into a first end of a drill string,
      (iii) conveying said at least one shuttle by means of pumped drilling fluid to said borehole assembly which terminates a second end of said drill string,
      (iv) synchronizing said downhole clock with said shuttle clock via said data port to obtain said reference clock and downhole clock synchronization to within a predetermined limit;
   (e) combining outputs from said reference clock and from said downhole clock and from said at least one sensor to determine said geophysical parameter; and
   (f) launching each shuffle of said plurality of shuttles sequentially at time intervals required to maintain said reference clock and shuttle clock synchronization within a predetermined limit.

18. The method of claim 17 further comprising the additional steps of:
   (a) linking said borehole assembly to said surface equipment with a telemetry system; and (b) determining durations of said time intervals using information telemetered from said borehole assembly to said surface equipment via said telemetry system.

19. The method of claim 17 wherein said data port comprises a short range radio frequency transmitter and a radio frequency receiver and an antenna operationally connected to said transmitter and said receiver.

20. The method of claim 17 wherein said data port comprises a wet connector.

21. The method of claim 17 wherein said at least one sensor comprises a seismic sensor.

22. A method for determining a geophysical parameter in the vicinity of a borehole, the system comprising:
  (a) providing surface equipment comprising a reference clock;
  (b) providing at least one shuttle comprising a shuttle clock and a data port;
  (c) providing a borehole assembly comprising at least one sensor and a downhole clock;
  (d) synchronizing said downhole clock with said reference clock by
    (i) synchronizing said shuttle clock with said reference clock via said data port,
    (ii) subsequently launching at least one said shuttle into a first end of a drill string,
    (iii) conveying said at least one shuttle by means of pumped drilling fluid to said borehole assembly which terminates a second end of said drill string,
    (iv) synchronizing said downhole clock with said shuttle clock via said data port to obtain said reference clock and downhole clock synchronization to within a predetermined limit;
  (e) combining outputs from said reference clock and from said downhole clock and from said at least one sensor to determine said geophysical parameter;
  (f) providing a pressure housing for each said shuttle in which said shuttle clock and said data port are incorporated; and
  (g) deforming each said pressure housing thereby allowing disposal of said shuttle within said borehole after synchronizing said downhole clock with said shuttle clock via said data port to obtain said reference clock and downhole clock synchronization.

23. The method of claim 22 wherein said predetermined limit is one millisecond or less.

* * * * *